United States Patent [19]

Brandt et al.

[11] Patent Number: 4,699,644
[45] Date of Patent: Oct. 13, 1987

[54] PLANT NUTRIENT COMPOSITION

[76] Inventors: Alan E. Brandt, 2627 Delaware Ave., Redwood City, Calif. 94061; Paul Houghton, 16230 Skyline Blvd., Woodside, Calif. 94062

[21] Appl. No.: 812,783
[22] Filed: Dec. 23, 1985
[51] Int. Cl.$^4$ .......................... C05G 3/00; C05G 3/04
[52] U.S. Cl. ......................................... 71/27; 71/903; 71/65; 71/64.1
[58] Field of Search ................... 71/11, 27, 903, 64.1, 71/65

[56] References Cited

U.S. PATENT DOCUMENTS 4,462,819  7/1984  Van Der Puy et al. ................. 71/28

OTHER PUBLICATIONS

Trace Elements in Soil and Plants, pp. 58 and 66–68, 1984, Pendias.
Shabde, M., et al., Amer. J. Bot (1977), 64(4):443–448.

Primary Examiner—Ferris H. Lander
Attorney, Agent, or Firm—Ciotti & Murashige, Irell & Manella

[57] ABSTRACT

A plant nutrient composition is described that includes those mineral, ionic, and hormones required by plants to carry out their biological and metabolic processes. The composition includes

| Component | Concentration (moles/L) |
|---|---|
| $Ca^{++}$ | $2 \times 10^{-3}$ to $7 \times 10^{-3}$ |
| $Co^{++}$ | $0.5 \times 10^{-7}$ to $3 \times 10^{-7}$ |
| $MoO_4$ | $0.5 \times 10^{-6}$ to $3 \times 10^{-6}$ |
| $K^+$ | $4 \times 10^{-6}$ to $8 \times 10^{-6}$ |
| $I^-$ | $4 \times 10^{-6}$ to $8 \times 10^{-6}$ |
| $Fe^{+++}$ | $0.5 \times 10^{-3}$ to $3 \times 10^{-3}$ |
| $Cu^{++}$ | $5 \times 10^{-8}$ to $3 \times 10^{-7}$ |
| $Mg^{++}$ | $7 \times 10^{-4}$ to $2 \times 10^{-3}$ |
| $Mn^{++}$ | $0.5 \times 10^{-4}$ to $3 \times 10^{-4}$ |
| $Zn^{++}$ | $2 \times 10^{-5}$ to $5 \times 10^{-5}$ |
| $BO_4^{--}$ | $0.5 \times 10^{-4}$ to $3 \times 10^{-4}$ |
| $Ni^{++}$ | $1 \times 10^{-10}$ to $4 \times 10^{-10}$ |
| auxin | $1 \times 10^{-6}$ to $4 \times 10^{-6}$ |
| thiamin | $0.5 \times 10^{-6}$ to $3 \times 10^{-6}$ |
| cytokinin | $4 \times 10^{-6}$ to $8 \times 10^{-6}$ |

The formulation provides these ions and hormones in a balanced water soluble form for rapid uptake and utilization by the plant.

2 Claims, No Drawings

PLANT NUTRIENT COMPOSITION

DESCRIPTION

1. Technical Field

This invention is in the field of plant nutrient compositions. More particularly it relates to a formulation of inorganic and organic components required by plants as cofactors to carry out their biological and metabolic processes.

2. Description of the Invention

The present invention provides a novel plant nutrient composition that includes growth stimulating hormones as well as mineral and ionic components needed by plants for vigorous growth, a method of preparing the composition without precipitation, and a method of stimulating the growth of a plant using the composition.

The plant nutrient composition of the invention comprises an aqueous solution of the following components:

| Component | Concentration (moles/L) |
|---|---|
| $Ca^{++}$ | $2 \times 10^{-3}$ to $7 \times 10^{-3}$ |
| $Co^{++}$ | $0.5 \times 10^{-7}$ to $3 \times 10^{-7}$ |
| $MoO_4$ | $0.5 \times 10^{-6}$ to $3 \times 10^{-6}$ |
| $K^+$ | $4 \times 10^{-6}$ to $8 \times 10^{-6}$ |
| $I^-$ | $4 \times 10^{-6}$ to $8 \times 10^{-6}$ |
| $Fe^{+++}$ | $0.5 \times 10^{-3}$ to $3 \times 10^{-3}$ |
| $Cu^{++}$ | $5 \times 10^{-8}$ to $3 \times 10^{-7}$ |
| $Mg^{++}$ | $7 \times 10^{-4}$ to $2 \times 10^{-3}$ |
| $Mn^{++}$ | $0.5 \times 10^{-4}$ to $3 \times 10^{-4}$ |
| $Zn^{++}$ | $2 \times 10^{-5}$ to $5 \times 10^{-5}$ |
| $BO_4^{--}$ | $0.5 \times 10^{-4}$ to $3 \times 10^{-4}$ |
| $Ni^{++}$ | $1 \times 10^{-10}$ to $4 \times 10^{-10}$ |
| auxin | $1 \times 10^{-6}$ to $4 \times 10^{-6}$ |
| thiamin | $0.5 \times 10^{-6}$ to $3 \times 10^{-6}$ |
| cytokinin | $4 \times 10^{-6}$ to $8 \times 10^{-6}$ |

The method of making the above described composition involves forming separate aqueous solutions of certain components of the composition and then combining the two solutions. More specifically, the method comprises:

(a) forming a first aqueous solution of the calcium, cobalt, molybdate, potassium, iodide, and feric ions and the auxin;

(b) forming a second aqueous solution of the cupric, magnesium, manganese, zinc, borate, and nickel ions and the thiamin and cytokinin; and (c) combining the first aqueous solution and the second aqueous solution.

The method of enhancing the growth of a plant comprises applying an effective amount of the composition to the medium in which the plant is growing.

MODES FOR CARRYING OUT THE INVENTION

The nutrient composition provides mineral, ionic, and growth stimulating hormones required by all organisms of the kingdom Plantae for normal growth processes. These materials are provided in the form of water-soluble concentrates that may be diluted and combined to form a balanced solution for rapid uptake and use by plants. It is particularly useful for providing such nutrition to higher order green plants such as those grown in the home or in the garden.

Water soluble salts are used to provide the ion components of the composition. These salts may be complexed with a variable number of associated water molecules, depending upon the particular salt. The composition includes an auxin (a compound that stimulates cell elongation) and a cytokinin (a compound that stimulates cell division). Examples of auxins that may be used in the composition are 3-indoleacetic acid, 4-chloro-indol-3-acetic acid, naphthalenacetic acid, indolepropionic acid, indolebutyric acid, 2,4-dichlorophenoxyacetic acid, phenylacetic acid, ester derivatives of these acids such as the myo-inositol and glucose esters, and amide derivatives formed with amino acids such as L-aspartic acid, L-glycine, L-alanine, and L-phenylalanine. Examples of cytokinins that may be used are kinetin, zeatin, 6-benzylaminopurine, and 2-isopentenyladenine. 3-Indoleacetic acid is a preferred auxin and kinetin is a preferred cytokinin for use in the composition.

The composition is formulated as two concentrated aqueous solutions that are diluted with water prior to use. A preferred formulation is given in Table 1 below. The two concentrates are designated Solution A and Solution B in the table. The table provides the preferred concentration for the concentrate, the preferred working concentration (i.e., diluted for use), the maximum concentration that can be dissolved, and the minimum working concentration.

| | Molecular Weight | Weight/L | Conc. in Growth Source Moles/L | Final Diluted Conc. Moles/L | Min. Conc. Moles/L | Max. Conc. Moles/L | Min. Conc. Grams/L | Max. Conc. Grams/L |
|---|---|---|---|---|---|---|---|---|
| Solution A | | | | | | | | |
| Calcium chloride di hydrate $CaCl_2$—$2H_2O$ | 147.02 | 147.25 gm | 1.00 | $3.91 \times 10^{-3}$ | $1.0 \times 10^{-5}$ | 20.0 | $1.47 \times 10^{-3}$ | $2.9 \times 10^3$ |
| Cobalt cholride hexahydrate $CoCl_2$—$6H_2O$ | 237.93 | 8.35 mg | $3.51 \times 10^{-5}$ | $1.37 \times 10^{-7}$ | $1.0 \times 10^{-10}$ | 2.0 | $2.4 \times 10^{-8}$ | $4.8 \times 10^2$ |
| Sodium molybdate dihydrate $Na_2MoO_4$—$2H_2O$ | 241.92 | 83.5 mg | $3.45 \times 10^{-4}$ | $1.34 \times 10^{-6}$ | $1.0 \times 10^{-8}$ | 2.0 | $2.4 \times 10^{-6}$ | $4.8 \times 10^2$ |
| Potassium iodide KI | 166.01 | 276.5 mg | $1.67 \times 10^{-3}$ | $6.52 \times 10^{-6}$ | $1.0 \times 10^{-8}$ | 2.0 | $1.66 \times 10^{-6}$ | $3.32 \times 10^2$ |
| Ferric sodium ethylenediaminetetraacetic acid $FeNaC_{10}H_{12}O_8N_2$ | 367.05 | 122 gm | $3.32 \times 10^{-1}$ | $1.32 \times 10^{-3}$ | $1.0 \times 10^{-6}$ | 10.0 | $1.22 \times 10^{-4}$ | $1.22 \times 10^3$ |
| 3-Indoleacetic acid $C_{10}H_9NO_2$ | 175.02 | 100 mg | $5.71 \times 10^{-4}$ | $2.23 \times 10^{-6}$ | $1.0 \times 10^{-8}$ | 1.0 | $1.75 \times 10^{-6}$ | $1.75 \times 10^2$ |
| Solution B | | | | | | | | |

-continued

| | Molecular Weight | Weight/L | Conc. in Growth Source Moles/L | Final Diluted Conc. Moles/L | Min. Conc. Moles/L | Max. Conc. Moles/L | Min. Conc. Grams/L | Max. Conc. Grams/L |
|---|---|---|---|---|---|---|---|---|
| Cupric sulfate pentahydrate $CuSO_4$—$5H_2O$ | 249.68 | 5.335 mg | $2.14 \times 10^{-5}$ | $8.36 \times 10^{-8}$ | $1.0 \times 10^{-10}$ | 2.0 | $2.5 \times 10^{-8}$ | $5.0 \times 10^2$ |
| Magnesium sulfate $MgSO_4$ | 120.37 | 29.5 gm | $2.45 \times 10^{-1}$ | $9.57 \times 10^{-4}$ | $1.0 \times 10^{-6}$ | 6.0 | $1.2 \times 10^{-4}$ | $7.22 \times 10^2$ |
| Manganese sulfate monohydrate $MnSO_4$—$H_2O$ | 169.06 | 5.65 gm | $3.34 \times 10^{-2}$ | $1.31 \times 10^{-4}$ | $1.0 \times 10^{-6}$ | 6.0 | $1.7 \times 10^{-4}$ | $1.0 \times 10^3$ |
| Zinc sulfate heptahydrate $ZnSO_4$—$7H_2O$ | 287.54 | 2.865 gm | $9.96 \times 10^{-3}$ | $3.89 \times 10^{-5}$ | $1.0 \times 10^{-8}$ | 10.0 | $2.9 \times 10^{-6}$ | $2.9 \times 10^3$ |
| Boric acid $H_3BO_4$ | 61.83 | 2.05 gm | $3.32 \times 10^{-2}$ | $1.30 \times 10^{-4}$ | $1.0 \times 10^{-6}$ | 5.0 | $6.2 \times 10^{-5}$ | $3.1 \times 10^2$ |
| 6-Furfurylaminopurine (Kinetin) $C_{10}H_9N_5O$ | 215.2 | 330 mg | $1.53 \times 10^{-3}$ | $6.00 \times 10^{-6}$ | $1.0 \times 10^{-8}$ | 1.0 | $2.1 \times 10^{-6}$ | $2.15 \times 10^2$ |
| Thiamin hydrochloride (Vitamin B-1) $C_{12}H_{18}Cl_2N_4SO$ | 337.3 | 133.5 mg | $3.96 \times 10^{-4}$ | $1.55 \times 10^{-6}$ | $1.0 \times 10^{-8}$ | 1.0 | $2.6 \times 10^{-6}$ | $2.64 \times 10^2$ |
| Nickel sulfate hexahydrate $NiSO_4$—$6H_2O$ | 262.86 | 16 μgm | $6.09 \times 10^{-8}$ | $2.38 \times 10^{-10}$ | $1.0 \times 10^{-12}$ | 1.0 | $2.6 \times 10^{-10}$ | $2.6 \times 10^2$ |

The compositions of Solution A and Solution B were selected to prevent precipitation of components by avoiding anion-cation combinations that are insoluble at the concentrations used in the formulation but are soluble when diluted and mixed to the final working concentrations. The anion or cation portions of the salts may be altered, as the case may be, and their assignment to Solution A or Solution B changed such that the final solution does not contain insoluble components. Alternatively, the components may be prepared as individual solutions or any number of solution mixtures such that when they are combined, a water soluble final working solution is obtained. By way of example, the metaborate or tetraborate ions may be used in place of the borate ion, other halide ions may be used in place of the chloride ion. Examples of other anions that may be used as salt components in the invention are carbonate, hydroxide, nitrate, nitrite, dihydrogen phosphate, monohydrogen phosphate, triphosphate, pyrophosphate, sulfate, sulfite, dithionite, thiocyanate, bromate, cholrate, ferricyanide, iodate, chromate, and dichromate.

Organic acid anions can also be used as counterions to the metal cations. These organic acids are carboxylic acids and may be aliphatic, cycloaliphatic, aromatic or heterocyclic in nature.

In those cases where the anion is of nutritional interest, the counter cation may be replaced with other suitable cationic species in a similar manner. By way of example, the sodium ion in the sodium molybdate dihydrate may be replaced with other alkali metal cations such as potassium or lithium. The metal salts may also be used either as an anhydride form or in a hydrated form to yield the final working concentrations.

EXAMPLE

Aqueous solutions having the compositions of Solution A and Solution B of the above table were made. The solutions were shaken well and one tablespoon of Solution A was diluted in one gallon of water and mixed well. One tablespoon of Solution B was added to the one gallon of diluted Solution A with mixing.

The resulting composition has been applied to various plant types including grasses, vegetables, fruits, ferns, succulents, and flowering plants such as geranium, cymbidium, pansy, iris, daffodil, tulup, azelia, fuscia, rhododendron, and jade to enhance their growth. No harmful effects have been observed in these tests. The composition will typically be applied to the medium in which the plant is growing on a regular basis, such as once a month. When the plant is growing in soil, the composition is applied to the soil with regular watering.

Modifications of the above described composition that are obvious to those of skill in plant nutrition, chemistry and related fields are intended to be within the scope of the following claims.

We claim:

1. A plant nutrient composition consisting essentially of an aqueous solution of the following components:

| Component | Concentration (moles/L) |
|---|---|
| $Ca^{++}$ | $2 \times 10^{-3}$ to $7 \times 10^{-3}$ |
| $Co^{++}$ | $0.5 \times 10^{-7}$ to $3 \times 10^{-7}$ |
| $MoO_4$ | $0.5 \times 10^{-6}$ to $3 \times 10^{-6}$ |
| $K^+$ | $4 \times 10^{-6}$ to $8 \times 10^{-6}$ |
| $I^-$ | $4 \times 10^{-6}$ to $8 \times 10^{-6}$ |
| $Fe^{+++}$ | $0.5 \times 10^{-3}$ to $3 \times 10^{-3}$ |
| $Cu^{++}$ | $5 \times 10^{-8}$ to $3 \times 10^{-7}$ |
| $Mg^{++}$ | $7 \times 10^{-4}$ to $2 \times 10^{-3}$ |
| $Mn^{++}$ | $0.5 \times 10^{-4}$ to $3 \times 10^{-4}$ |
| $Zn^{++}$ | $2 \times 10^{-5}$ to $5 \times 10^{-5}$ |
| $BO_4^{--}$ | $0.5 \times 10^{-4}$ to $3 \times 10^{-4}$ |
| $Ni^{++}$ | $1 \times 10^{-10}$ to $4 \times 10^{-10}$ |
| auxin | $1 \times 10^{-6}$ to $4 \times 10^{-6}$ |
| thiamin | $0.5 \times 10^{-6}$ to $3 \times 10^{-6}$ |
| cytokinin | $4 \times 10^{-6}$ to $8 \times 10^{-6}$ |

2. The plant nutrient composition of claim 1 wherein the auxin is 3-indoleacetic acid and the cytokinin is kinetin.

* * * * *